United States Patent
Tembey et al.

(10) Patent No.: US 12,495,063 B2
(45) Date of Patent: Dec. 9, 2025

(54) MULTI-LAYER APPLICATION SECURITY GRAPH FOR CLOUD-NATIVE APPLICATIONS USING RUNTIME APPLICATION TELEMETRY COLLECTED IN REAL-TIME

(71) Applicant: Operant AI, Inc., San Francisco, CA (US)

(72) Inventors: Priyanka Mohan Tembey, San Francisco, CA (US); Vrajesh Rajesh Bhavsar, San Francisco, CA (US); Ashley Michelle Chapman Roof, San Francisco, CA (US)

(73) Assignee: Operant AI, Inc., San Francisco, CA (US)

( * ) Notice: Subject to any disclaimer, the term of this patent is extended or adjusted under 35 U.S.C. 154(b) by 96 days.

(21) Appl. No.: 18/544,071

(22) Filed: Dec. 18, 2023

(65) Prior Publication Data

US 2024/0205259 A1    Jun. 20, 2024

Related U.S. Application Data

(60) Provisional application No. 63/476,273, filed on Dec. 20, 2022.

(51) Int. Cl.
*H04L 9/40* (2022.01)
(52) U.S. Cl.
CPC .............. *H04L 63/1433* (2013.01)
(58) Field of Classification Search
CPC .................................................. H04L 63/1433
See application file for complete search history.

(56) References Cited

U.S. PATENT DOCUMENTS

| | | | |
|---|---|---|---|
| 9,774,517 B2 | 9/2017 | Wittenstein et al. | |
| 11,100,231 B2 | 8/2021 | Fulp et al. | |
| 11,438,361 B2* | 9/2022 | Rakesh | H04L 63/1425 |

(Continued)

FOREIGN PATENT DOCUMENTS

| | | | | |
|---|---|---|---|---|
| CN | 108494810 A | * | 9/2018 | H04L 41/142 |
| CN | 113055296 A | * | 6/2021 | H04L 61/2503 |

(Continued)

OTHER PUBLICATIONS

Ke. English translation of CN 113055296 A. (Year: 2021).*

(Continued)

*Primary Examiner* — Sarah Su
(74) *Attorney, Agent, or Firm* — Baker Botts L.L.P.

(57) ABSTRACT

A computer-implemented method generates and manages a dynamic security graph that visualizes runtime security and risk context across a cloud-native application. The graph displays real-time interactions among application components, such as API traffic flows across public-facing endpoints, internal microservices, third-party APIs, and data stores. It maps user and service identities, roles, and access patterns to API and data resources, and tracks data flows that egress to external destinations. The graph highlights security vulnerabilities at each layer. Graph analytics can identify potential attack vectors by correlating risks across identities, APIs, and data layers. Embodiments include a computer system, method, and program product as recited in the claims.

25 Claims, 6 Drawing Sheets

(56) References Cited

U.S. PATENT DOCUMENTS

| | | | |
|---|---|---|---|
| 2014/0090071 A1 | 3/2014 | Salehie et al. | |
| 2018/0288091 A1* | 10/2018 | Doron | H04L 63/1458 |
| 2020/0396230 A1* | 12/2020 | Liu | H04L 63/1416 |
| 2022/0121741 A1* | 4/2022 | Araujo | G06F 21/566 |
| 2022/0311798 A1* | 9/2022 | Dani | H04L 63/1433 |
| 2022/0329617 A1* | 10/2022 | Bruttomesso | H04L 41/12 |
| 2024/0054227 A1* | 2/2024 | Dahmen | G06F 21/566 |
| 2024/0070291 A1* | 2/2024 | Lee | G06F 21/567 |
| 2024/0291831 A1* | 8/2024 | Tembey | G06F 9/547 |
| 2024/0311483 A1* | 9/2024 | Davraev | G06F 21/55 |
| 2024/0380785 A1* | 11/2024 | Lahav | H04L 63/1416 |
| 2024/0386099 A1* | 11/2024 | Weizman | G06F 21/577 |
| 2024/0386132 A1* | 11/2024 | Ezra | G06F 16/285 |
| 2024/0406145 A1* | 12/2024 | Crabtree | H04L 63/1425 |
| 2025/0097252 A1* | 3/2025 | Salarian | H04L 63/1433 |
| 2025/0106261 A1* | 3/2025 | Sridhar | H04L 63/1416 |
| 2025/0159016 A1* | 5/2025 | Hen | G06F 21/577 |

FOREIGN PATENT DOCUMENTS

| | | | | |
|---|---|---|---|---|
| CN | 114915475 A | * | 8/2022 | H04L 63/1416 |
| CN | 116318977 A | * | 6/2023 | H04L 63/1416 |
| CN | 118118208 A | * | 5/2024 | H04L 63/0263 |
| CN | 119210889 A | * | 12/2024 | G06N 3/098 |
| CN | 119324817 A | * | 1/2025 | G06N 20/20 |
| CN | 119420576 A | * | 2/2025 | G06N 5/02 |
| KR | 1020190017209 A | | 2/2019 | |
| KR | 102079687 B1 | * | 2/2020 | G06F 21/577 |
| KR | 20200034148 A | * | 3/2020 | H04L 63/1425 |
| WO | 2015199719 A1 | | 12/2015 | |
| WO | WO-2024044053 A1 | * | 2/2024 | G06F 9/5077 |
| WO | WO-2025024615 A2 | * | 1/2025 | H04L 63/1441 |

OTHER PUBLICATIONS

Lai. English translation of CN 119324817 A. (Year: 2024).*
Anonymous, "Kubernetes_Dynamic Admission Control," which is available online at https://kubernetes.io/docs/reference/access-authn-authz/extensible-admission-controllers/, last modified Feb. 18, 2024, retrieved May 17, 2024, 22 pages.
Song, J., "Understanding the Sidecar Injection, Traffic Intercepting & Routing Process in Istio," available online at https://jimmysong.io/en/blog/sidecar-injection-iptables-and-traffic-routing, retrieved May 13, 2024, 11 pages.
Kim, Sung He, International Search Report and Written Opinion, Application No. PCT/US2023/084562, pub. by Korean Intellectual Property Office, Apr. 29, 2024, Seo-gu, Daejeon, 11 pages.
Anonymous, "Envoy documentation," © Copyright 2016-2022, Envoy Project Authors, https://www.envoyproxy.io/docs/envoy/v1.24.1/, web retrieval Jun. 17, 2024, 2 pages.
Miki Kobayashi, International Preliminary Report on Patentablity, Application No. PCT/US2023/084562, dated Jul. 3, 2025, 7 pages, pub. by The International Bureau of WIPO, Geneva, Switzerland.

* cited by examiner

MULTI-LAYER APPLICATION SECURITY GRAPH FOR CLOUD-NATIVE APPLICATIONS USING RUNTIME APPLICATION TELEMETRY COLLECTED IN REAL-TIME

BENEFIT CLAIM

This application claims the benefit under 35 U.S.C. 119(e) of provisional application 63/476,273, filed Dec. 20, 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Operant AI, Inc.

TECHNICAL FIELD

One technical field of the present disclosure is computer-implemented methods of network management, security engineering, and security management. Another technical field is cloud computing.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Security engineering is the technical field relating to understanding networked resources and topologies, determining potential attack vectors, and hardening distributed systems against improper or unauthorized access. As networks of distributed computing resources become larger and more complex, network administrators, IT teams, and security analysts can lose the ability to efficiently determine what endpoints, APIs, and other networked resources have connectivity or are exposed to contact from external clients or attackers. Effective security engineering often requires developing visualizations or datasets describing distributed systems that can be explored and inspected to identify attack vectors.

In some past approaches, security engineers have sought to assess the runtime behavior of a distributed system based on inspecting server log files to determine which applications within an enterprise have called which external APIs and how internal application APIs served external programmatic calls of clients. Log-based approaches generally need offline, potentially manual processing, which is not capable of producing a real-time view of the behavior of an application. With high network traffic volume and highly dynamic microservice-based apps, log-based approaches cannot scale to keep pace with today's complex networks. Furthermore, supporting a log-based approach requires instrumenting the targets of data collection with instructions to output useful log records. Coding instrumentation involves heavy manual work. Therefore, security engineers need better ways to identify application traffic and the incoming and outgoing application connections in real time for all microservices associated with an application.

Additionally, the scale of user and machine identities in today's cloud-native software stacks continues to increase. Relevant data include identities and roles of users who access an application or resource, API keys, certificates for devices that may have access to an API, API identifiers, internal developer accounts, service accounts that access internal cloud services and third-party APIs, and more. Consequently, tracking who is accessing a resource or API, and defining access policies, no longer can be defined in terms of IP addresses alone, as with older, firewall-based approaches. Also, identity access policies can no longer be simply network-based; they need to account for APIs, data, and applications.

Finally, today's cloud-native applications are not always deployed in controlled environments; they may run in third-party cloud infrastructure and in infrastructure layers such as containerization platforms. The security of a modern cloud-native application needs to encompass the application layer, the API layer, the container, virtual machines, and other cloud infrastructure. However, contemporary security engineering tools do not comprehensively address all logical layers of today's application deployments.

SUMMARY

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended to limit the disclosure in any way or as a basis for interpreting the claims. Devices that are described as in communication with each other need not be in continuous communication with each other unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to fully illustrate one or more aspects of the inventions. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or some occurrences, or some steps may be executed more than once in a given embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

In various embodiments, a computer-implemented method, distributed systems architecture, and computer program product are programmed to generate and manage an application security graph bringing together runtime security and risk context across every layer of a cloud-native application for security engineering teams. In this context, a security graph is a dynamic map of a customer's application stack displayed in real-time. In one embodiment, a visualization of the security graph in a graphical user interface can show the following:

1. API traffic flows across multiple layers of the application from the public-facing API endpoint layer to internal microservices, external third-party APIs, and a data store layer.
2. External and internal user (usernames, emails) and service (API keys, device certificates, etc.) identities and roles at play and how they access various API and data resources and through which microservices.
3. Data flows originate within internal microservices of a customer environment but end up egressing the environment to either third-party APIs/external IP addresses/services or external data stores.
4. Security vulnerabilities within each application layer, such as unauthenticated API endpoints allowing open access to a service's APIs, a container image having a critical CVE vulnerability, or an external data store that is misconfigured with suboptimal security parameters.

Using graph analytics, the dynamic map shows potential attack vectors into a customer's applications by triangulating risk across multiple layers, including identities, API accesses, and data stores and vulnerabilities to show what assets are at critical risk, how can they be breached in a potential attack, and what can be done to protect those assets.

Embodiments improve over past approaches in many ways. For example, embodiments are telemetry driven. Rather than depending upon logs and log instrumentation in applications, embodiments rely on a telemetry-based approach configured to intercept application traffic at runtime and deduce an application's incoming and outgoing connections in real-time, including for all microservices within an application. In an embodiment, a computer-implemented method is programmed to construct a complete application security graph in real-time that avoids the need to do any manual, offline processing.

Embodiments produce a more complete and accurate representation of an application security graph using automated, zero-instrumentation techniques to source the data needed to create the graph without relying on manual log-based approaches, which are inconsistently applied across microservices and may not capture all aspects of an application's traffic behavior reliably.

Embodiments are also identity-aware, based on the configuration of contemporary cloud-native apps, creating an application security graph that represents and provides visibility into what application layer resources identities access, including but not limited to APIs, data, services, or other resources and not just IP addresses.

Furthermore, embodiments can collect and correlate data across every layer of the modern cloud-native application to secure it in an end-to-end manner. Embodiments can graph elements of third-party cloud infrastructure and indicate the use of containerized platforms like Kubernetes. Therefore, security engineering for a modern cloud-native application can encompass applications, APIs, containers, virtual machines, and other infrastructure, as well as data and other external services that the application interacts with and depends on.

2. Structural & Functional Overview 2.1 Distributed Computer System Example

Figure 1:
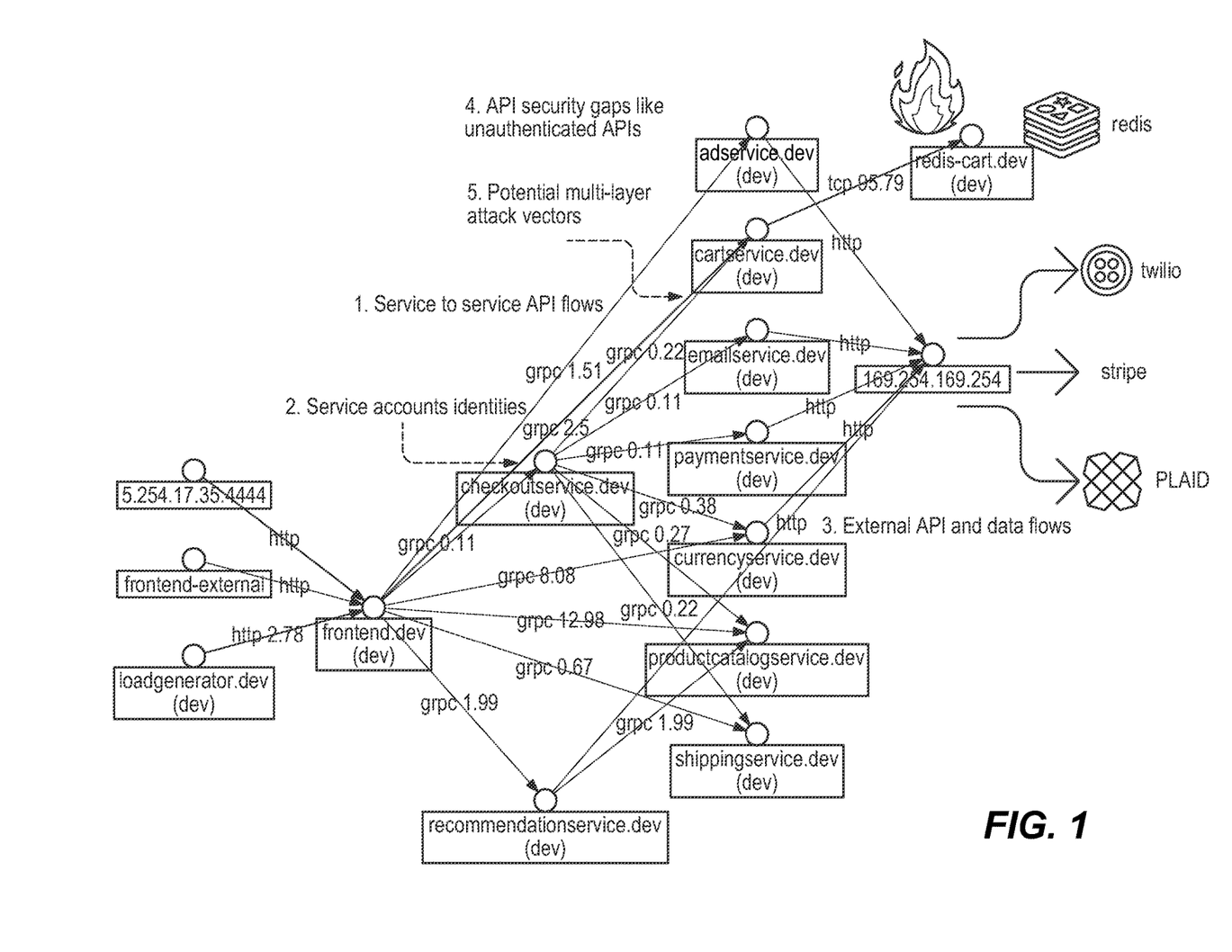
FIG. 1 illustrates an example computer display device with a graphical user interface showing a network graph that has been generated according to an embodiment.
Figure 2:
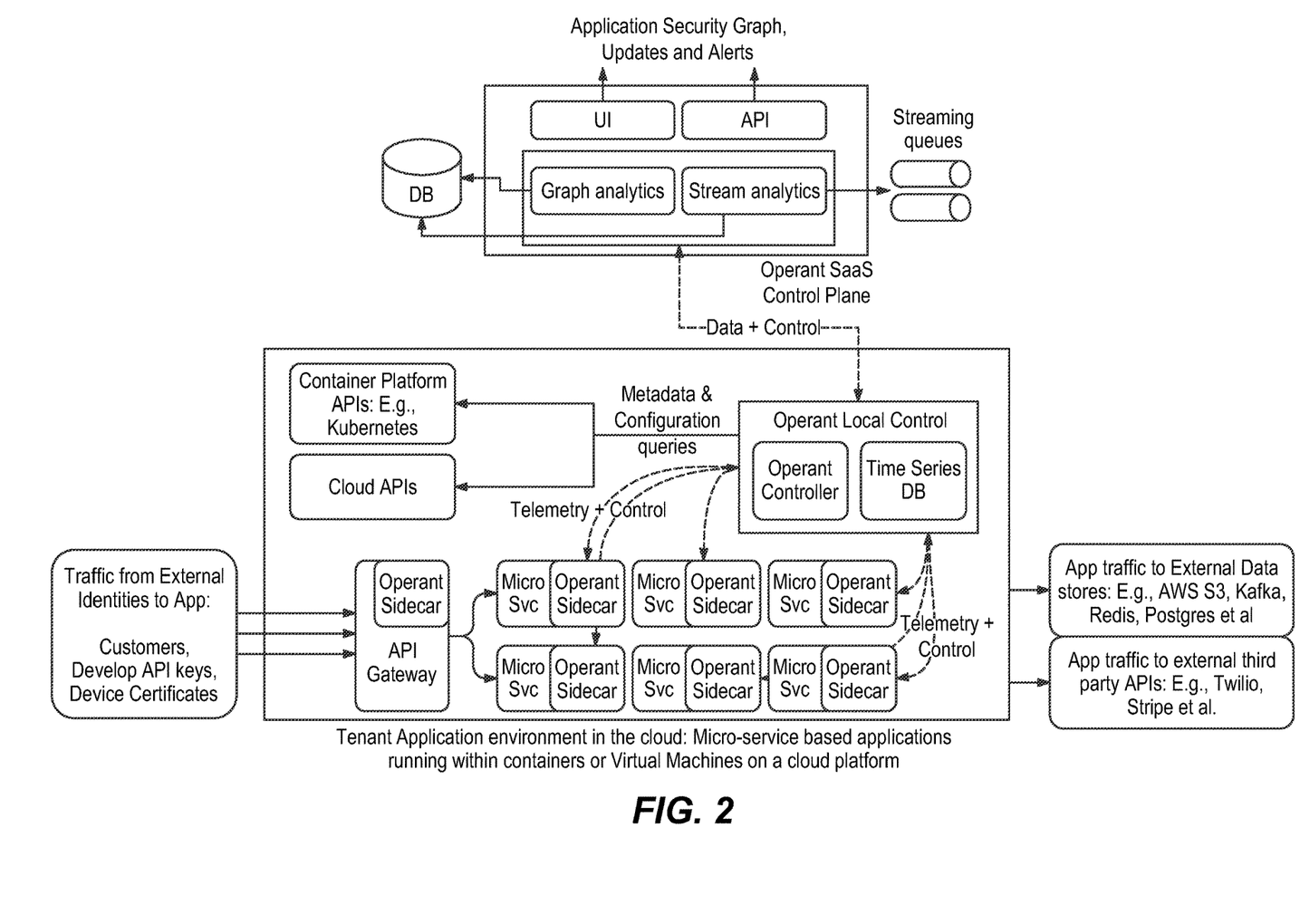
FIG. 2 illustrates a distributed computer system showing the context of use and principal functional elements with which one embodiment could be implemented.

FIG. 1 illustrates an example computer display device with a graphical user interface showing a network graph that has been generated according to an embodiment. FIG. 2 illustrates a distributed computer system showing the context of use and principal functional elements with which one embodiment could be implemented. In an embodiment, a computer system of an embodiment of FIG. 2 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 2 illustrates only one of many possible arrangements of components configured to execute the programming described herein. Other arrangements may include fewer or different components, and the division of work between the components may vary depending on the arrangement.

FIG. 2, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of multi-layer security engineering for cloud-native applications. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

As shown in FIG. 2, embodiments can be configured and programmed to deploy a hybrid architecture comprising the following components:

Local Control Plane: This is the part of the architecture deployed within a customer environment as a controller service, a time series database, and a per-customer microservice sidecar process. The implementation of sidecar processes in other contexts is described in Anonymous, "Envoy: Envoy documentation," which is available online at the time of this writing in the document tree at: in the folder/docs/ envoy/v1.24.1/of the domain envoyproxy.io via HTTPS on the World Wide Web. In one embodiment, a user or the customer deploys the local control plane using a script that interfaces with the customer's container platform API (e.g., the Kubernetes cluster API) to bring up the components. The controller service and the time series database come up as application containers running within the customer environment. The sidecar process hooks into the microservice's network path and thus has access to the APIs and data flows flowing in and out of the microservice. Establishing programmatic connections or hooks for this purpose is described, for other contexts, in J. Song, "Understanding the Sidecar Injection, Traffic Intercepting & Routing Process in Istio," available online at the time of this writing in the document or folder sidecar-injection-iptables-and-traffic-routing/of the path/en/blog/of the Internet domain jimmy-song.io. Microservices within a customer environment serve incoming requests coming through the frontend gateway layer from external customers, API developer accounts, and devices. An external request may traverse multiple internal microservice API layers as well as third-party API/data layers before a response is sent back to the external clients.

The controller service brings up the sidecar processes per microservice. To do this, the controller interfaces with the container platform API to derive a list of microservice containers deployed within the cluster. Using a sidecar webhook injection mechanism provided by the container platform, the controller adds the sidecar alongside each application. For the Kubernetes platform, an example injection mechanism is described in Anonymous, Kubernetes: Dynamic Admission Control, which is available online at the time of this writing at in the file extensible-admission-controllers/via the folder tree docs/reference/access-authn-authz/of the domain Kubernetes.io via HTTPS. Whenever there is a new microservice deployed in the customer environment, the webhook mechanism is used to deploy a new sidecar alongside each new microservice. The controller service goes on to configure the sidecars to look at specific telemetry data within microservice APIs and data flows such as:

Request source hostname
Request destination hostname
Request destination port
Request source service name (if any)
Request source namespace (if any)
Request destination service name (if any)
Request destination namespace (if any)
Request API endpoint
Request API method (Post, Get, Put, Delete, etc.)
Request protocol (HTTP, GRPC, TCP, Mysql, etc.)
Request authentication headers (if any)
Response code (if any)
Response Error message (if any)
Response Error status (if any)
Number of requests The particular sidecar implementation takes as an input a configuration document provided by the system in JSON or YAML specifying the parameters above and to configure its telemetry output accordingly. Embodiments can be programmed to go further in customizing the telemetry output specific to application layer protocols implemented by the microservice containers. As an example, an embodiment can be programmed to automatically detect known open ports on microservice containers (e.g., port 3306, which is a well-known server port for the Mysql database service) and configure the Mysql container's sidecar to output telemetry relevant to the Mysql protocol.

This list of keys and metrics constitutes a metric tuple stored in the time series database.

The controller service configures the sidecar processes to send metrics to the time series database for the application traffic seen every 15 seconds. TABLE 1 presents an example of code that can be used for this configuration:

TABLE 1

CONFIGURING SIDECAR TO SEND METRICS

```
apiVersion: install.istio.io/v1alpha1
kind: IstioOperator
spec:
  profile: minimal
  meshConfig:
    defaultConfig:
      extraStatTags:
      - request_method
      - request_urlpath
      - request_authorization
  values:
    telemetry:
      v2:
        prometheus:
          configOverride:
            inboundSidecar:
              metrics:
```

TABLE 1-continued

CONFIGURING SIDECAR TO SEND METRICS

```
              - name: requests_total
                dimensions:
                  request_method: request.method
                  request_urlpath: request.url_path
                  grpc_response_status: response.grpc_status
                  request_authorization:
                  request.headers.authorization
              - name: request_duration_milliseconds
                dimensions:
                  request_method: request.method
                  request_urlpath: request.url_path
                  grpc_response_status: response.grpc_status
            outboundSidecar:
              metrics:
              - name: requests_total
                dimensions:
                  request_method: request.method
                  request_urlpath: request.url_path
                  grpc_response_status: response.grpc_status
                  request_authorization:
                  request.headers .authorization
              - name: request_duration_milliseconds
                dimensions:
                  request_method: request.method
                  request_urlpath: request.url_path
                  grpc_response_status: response.grpc_status
```

TABLE 1-continued

CONFIGURING SIDECAR TO SEND METRICS

```
            gateway:
              metrics:
              - name: requests_total
                dimensions:
                  request_method: request.method
                  request_urlpath: request.url_path
                  grpc_response_status: response.grpc_status
                  request_authorization:
                  request.headers.authorization
              - name: request_duration_milliseconds
                dimensions:
                  request_method: request.method
                  request_urlpath: request.url_path
                  grpc_response_status: response.grpc_status
```

A control loop within the controller service queries the time series database every configurable amount of time to retrieve traffic telemetry metrics such as requests per second, successful requests/sec, errors/sec, and requests missing security parameters such as required authentication headers or ill-formed API expressions. These queries help filter the required data needed by the system from the time series database to ascertain the interconnections between microservices, and their security characteristics. TABLE 2 presents an example query.

TABLE 2

EXAMPLE RETRIEVAL QUERY sum+by+(source_workload,source_workload_namespace,destination_service_name,
request_protocol,destination_service,destination_workload,destination_workl
oad_namespace,request_urlpath,request_method)((rate(istio_requests_total{re
porter='source',source_workload_namespace=~'%s'}[300s]))+or+(rate(istio_tcp
_sent_bytes_total{reporter='source',source_workload_namespace=~'%s'}[300s])
)+or+(rate(istio_requests-total{reporter='destination',destination_workload
_namespace=~'%s',source_workload_namespace='unknown'}[300s])))

The controller service connects with a metadata service to retrieve additional information about services and applications seen in the traffic telemetry data. The metadata service is specific to the customer environment. In various embodiments, the metadata service could be the Kubernetes cluster API server if the customer applications are deployed within a Kubernetes cluster and the cloud provider API for the cloud system in which the customer applications are deployed. The information obtained from the metadata service can include the source and destination namespaces in the case of Kubernetes applications, container names, or virtual machine names. All such data constitutes additional annotations and context that the controller service adds to the metric tuple. For a Kubernetes implementation, the controller service queries the Kubernetes API server for service descriptions of source and destination host names seen in the traffic telemetry data. The service descriptions internally have certain "selector" key value labels that point to the microservice deployment/container names in the cluster. Querying the Kubernetes API server for container names specific to the selector labels provides additional metadata about the containers behind the service names.

Additionally, the controller service queries the metadata service for configurations specific to the application services/resources/data services that the microservices communicate with— especially their security-related configurations, such as whether the data stored in the database accessed by a microservice is encrypted or not, or whether the connection to the data service is encrypted or not, or how open is the access to a specific data resource based on its network configuration and so on. This information is collected so that the system can assess the vulnerabilities/risks in the customer environment and determine which application-level interactions are likely to cause critical security breaches.

After collecting the telemetry, configuration data, and metadata for the past control loop period for all microservices running in the customer environment, the controller service creates a message with the latest combined data as the payload and sends it out to the Operant SaaS control plane.

Referring again to FIG. 2, in an embodiment, a SaaS control plane operates as a central control plane that all customer-local controller services communicate with to send telemetry data and to fetch security policies and commands that are enforced locally in the customer environment. The central control plane comprises a message queue service, a controller service consisting of the middleware connecting frontend and API layers with backend data services, relational database services, stream processing services that perform event-based processing on data sourced from the message queue services, and graph processing services that run graph analytics algorithms on customer application telemetry data.

The frontend services and API layers present the application security graph visualizations and graph data outputs, respectively as they get updated in real-time while interfacing with backend middleware services.

The controller service in the customer environment sends the telemetry data payload to the message queue service, which enables the processing of this data in an event-based, asynchronous manner. The asynchronous processing pattern can easily be scaled to hundreds and thousands of customer environments. A streaming service receives this payload from the queue, processes the data, and stores the data in a relational format in a database. Frontend APIs and UI services pull this data from middleware APIs in a graph format and present it to the end user as a security graph.

2.2 Example Data Processing Flows

Figure 3:
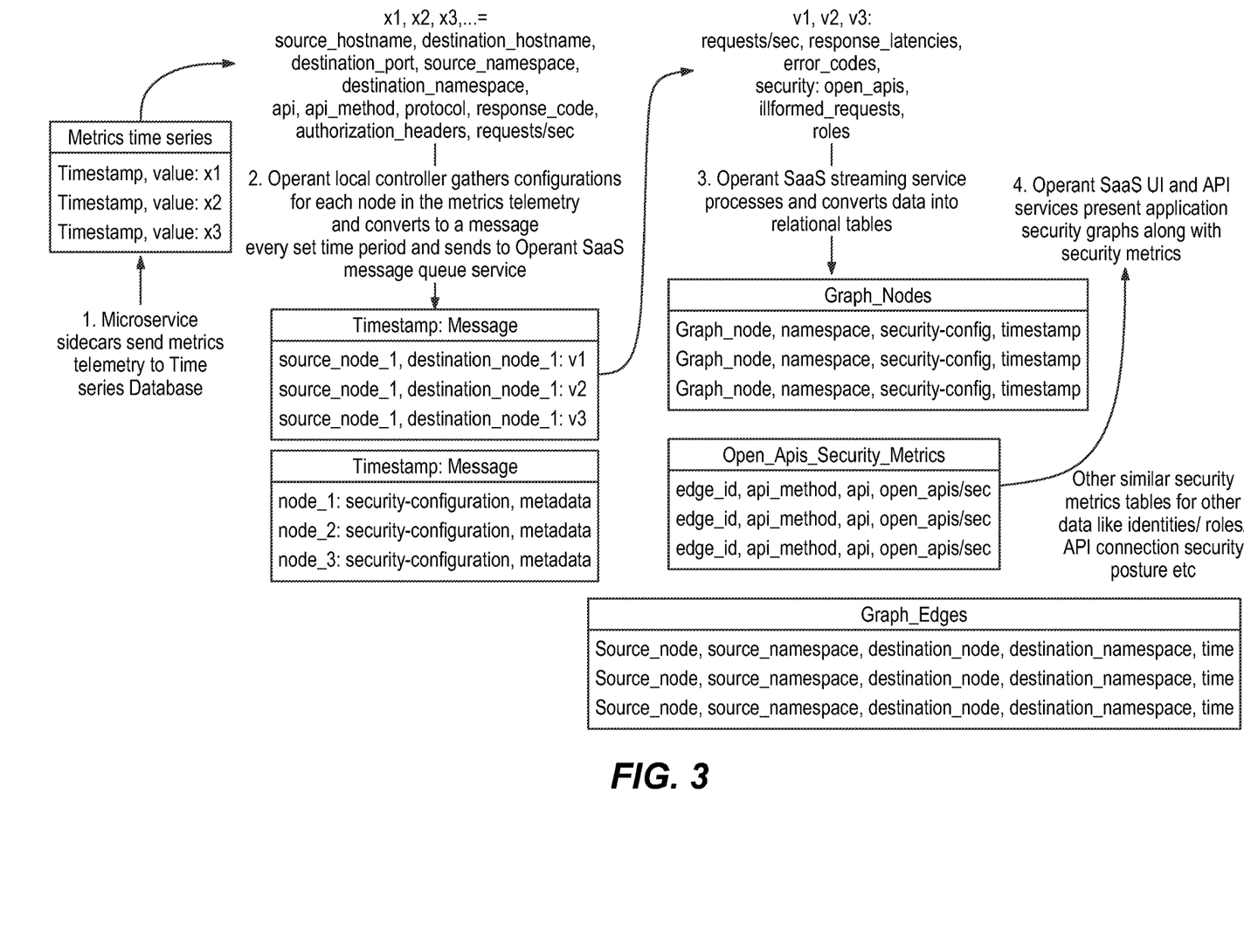
FIG. 3 illustrates example algorithms and data transformations that can generate a runtime application security graph in real-time using an embodiment.

FIG. 3 illustrates example algorithms and data transformations that can generate a runtime application security graph in real-time using an embodiment. FIG. 3 and each other flow diagram herein is intended as an illustration of the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In an embodiment, the local controller service in the customer environment configures the sidecar processes deployed alongside microservices to look at specific telemetry details within API and data traffic and sends them periodically to the time series database deployed in the same environment. The metrics stored in the time series represent different application request metrics including security metrics.

In Step 1, the example of FIG. 3 shows the metric "requests/sec" being added in the time series database which includes information keys about the source and destination hostnames, ports, API endpoints, request protocols, response codes including error codes and error messages, and requests/sec for a specific API endpoint within the source and destination service pair. Other examples include security metrics such as the number of API requests that are unauthenticated or unauthorized and identities/roles that access APIs and microservice data within the requests.

Each information key within an application metric adds to the cardinality of the data collected, as each potential key-value pair has a unique timestamp. This increasing cardinality could quickly lead to an exponential rise in metrics data collected. The local controller service handles this increasing scale by continuously filtering and aggregating key metrics from the time series database and sending the filtered summary metrics to the SaaS control plane service. By avoiding sending all the raw metrics directly to the cloud, the distributed processing in this manner reduces the cost of storage of metrics in the cloud while also reducing the amount of customer data that exits the customer environment for privacy and compliance reasons.

In Step 2, a control loop in the local controller service continuously queries the time series database for specific metrics over a larger period (5 minutes by default but configurable) in the order of a few minutes, aggregating the values and sending the aggregated metrics as a message to the message queue service in the cloud. This data payload within this message represents a graph data structure of source/destination microservice pairs along with the connection attributes for each edge within the graph (values v1, v2, etc., as seen in FIG. 3).

While aggregating metrics, the control loop process talks to the container metadata and cloud metadata services to add additional multi-layer security configurations and metadata about the source and destination microservice nodes in the messages that it sends out to the SaaS control plane. This multi-layer information for each node in the graph looks at things like security-related vulnerabilities within containers and virtual machines that the microservice is hosted in (gathered from CVE databases like NVD mapped to the microservice container images) and security-related gaps in the data store endpoints that the microservices communicate with (gathered by interfacing with the cloud provider API to collect configuration data about the data storage service that is used by microservices, such as an object store bucket misconfigured as being publicly accessible).

In Step 3, a streaming processor service receives the data from the message queue and converts the message into relational data to store in a relational database. In some embodiments, the KAFKA system available from APACHE can be used for message queuing. Processing messages asynchronously helps in scaling out the number of receiving streaming processors easily as more customer environments get added to the system. As each customer environment gets uniquely mapped to a partition within the message queue, the streaming processors receiving the messages can be horizontally scaled as the number of partitions is scaled proportionally to the customer environments. The relational data model is split into various tables, as seen in FIG. 3: a table to store the graph nodes, a table to store the graph edges, individual tables to store edge metrics like requests/sec, errors, and security metrics like unauthorized requests/sec. The metrics tables are linked to the graph tables using foreign keys representing graph node IDs and edge IDs to correlate security configurations and metadata with the graph nodes and edges. All the table rows have a timestamp as a key, as the graph and associated metrics and configurations are stored for a specific timestamp, which gets added over time. Operant stores a history of application security graphs in this manner and allows for historical querying of the graph data to understand application interactions and security risks as they evolve over time.

In Step 4, a graphical user interface and API present the application security graph as a visualization and JSON/YAML data, respectively, by pulling in data from the relational databases through data middleware layers. Various embodiments can implement one or more of the following queries for graph analytics against the application security graph. These execute as periodic analytics processors computing queries on the graph data over time.

Figure 4:
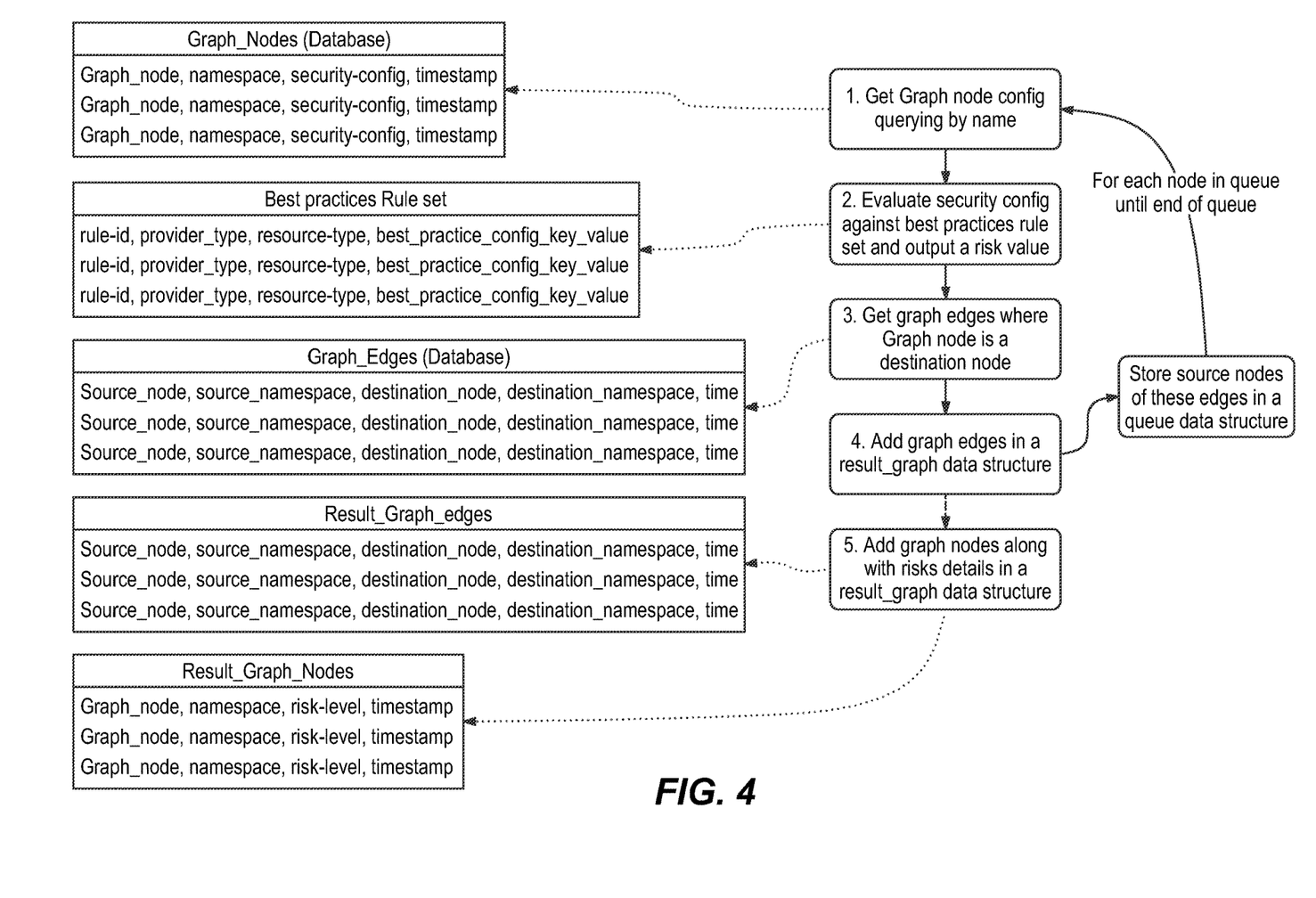
FIG. 4 illustrates an example computing subgraph that highlights security risks and attack vectors for a specific data node.

1. Highest criticality attack paths to potential data assets in the deep backend of a customer's application architecture that are otherwise blind spots: In an embodiment, programmed graph analytics ties together the vulnerabilities and security configuration context of different graph nodes that connect and form potential attack paths into a critical data store or cache element, as seen in FIG. 4. The analytics processor analyzes connected graph paths representing API or data flows that flow into each graph node, collecting the security configuration for each node and comparing it against the best practice configuration of the graph node to determine a risk or security gap value. This computation is done for all nodes along the graph paths leading to a node to determine potential security attack vectors along the security graph for each microservice or data asset.

A potential remediation for a security gap such as APIs that allow unauthenticated access is to add proper authentication best practices for all APIs which would check authentication validity and expiry. This sort of remediation can be added by the users of the system by making application code changes to add relevant authentication checks to their APIs or using enforcement capabilities within the system to shut down access for invalid or unauthenticated access. The system's enforcement point within the customer environment is via the microservice sidecar. The system configures the sidecar to stop unauthenticated access in an automated manner without needing any application code changes.

Figure 5:
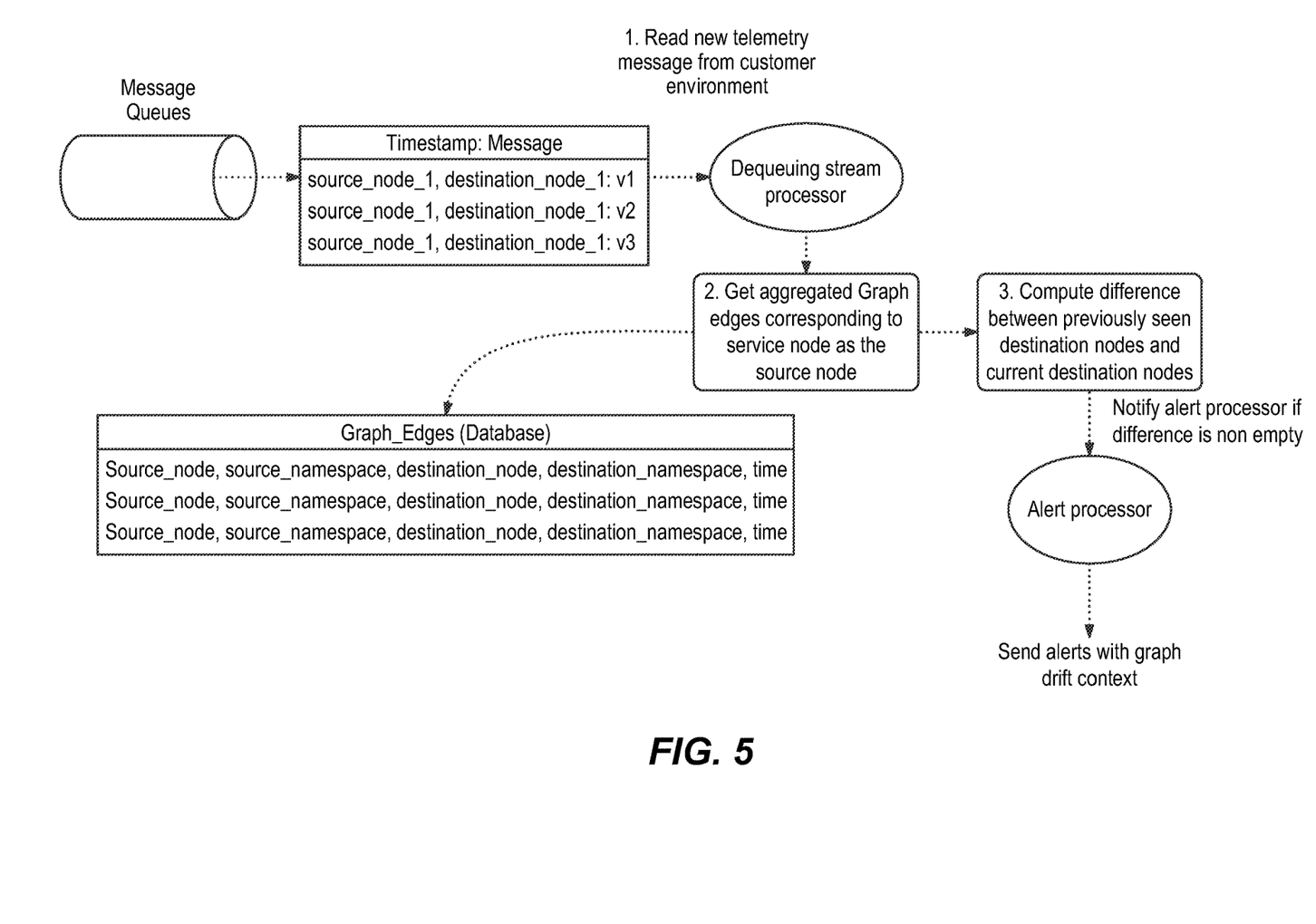
FIG. 5 illustrates a data flow and processing steps to detect drift in data representing previously seen microservice connections and new connections.

2. Drift in microservice interactions over time highlighting unknown external connections in real-time. As the system stores graphs and associated metrics over time, graph analytics programmed in embodiments continuously try to detect drift in microservices interactions over time, especially if the microservice is seen talking to unknown external IP addresses or third-party APIs. As seen in FIG. 5, a streaming processor dequeues new messages coming in from the customer environment and determines the drift between destination services seen for each node in the new telemetry vs previously seen services. If there is a drift from previously understood connections, an alert is sent to a security team alerting them of a drift in microservice behavior.

A potential remediation for such a security event is to assess whether the access is potentially nefarious. Users can help tag such accesses manually as nefarious and shut them down using application code changes or patching the container image to disallow the nefarious access if the access originated from within the container shell via a nefarious actor. Using the system, users can shut down the access by enforcing a policy within the sidecar that disallows outgoing microservice traffic to the relevant IP address and port, hostname, or API URL.

3. Implementation Example— Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
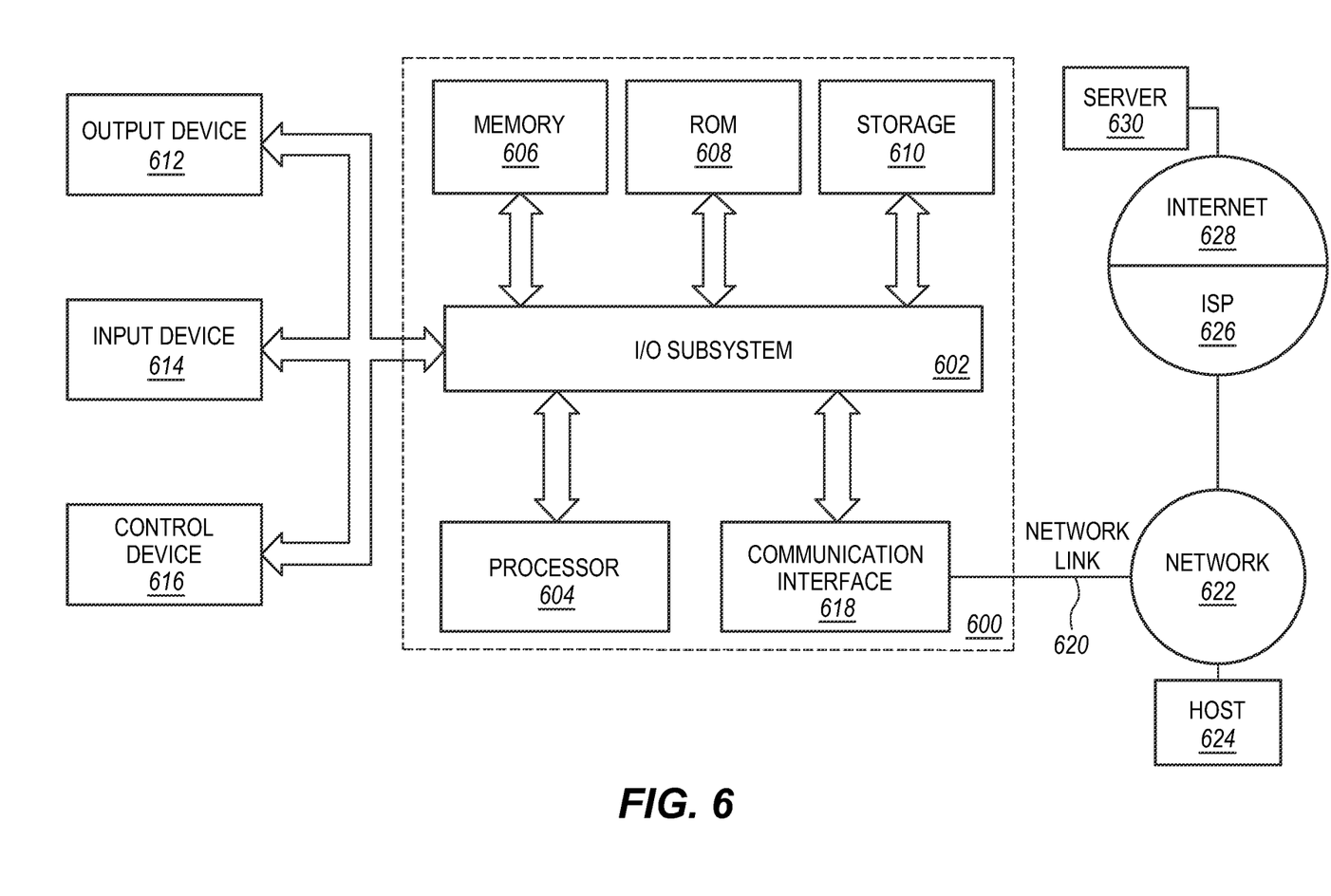
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 600 includes an input/output (I/O) subsystem 602, which may include a bus and/or another communication mechanism(s) for communicating information and/or instructions between the components of the computer system 600 over electronic signal paths. The I/O subsystem 602 may include an I/O controller, a memory controller, and at least one I/O port. The electronic signal paths are represented schematically in the drawings, for example, as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system, a graphics processing unit (GPU), a digital signal processor, or an ARM processor. Processor 604 may comprise an integrated arithmetic logic unit (ALU) or may be coupled to a separate ALU.

Computer system 600 includes one or more units of memory 606, such as the main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage device coupled to I/O subsystem 602 for storing information and instructions for processor 604. The ROM 608 may include various forms of programmable ROM (PROM), such as erasable PROM (EPROM) or electrically erasable PROM (EEPROM). A unit of persistent storage 610 may include various forms of non-volatile RAM (NVRAM), such as FLASH memory, solid-state storage, magnetic disk, or optical disks such as CD-ROM or DVD-ROM and may be coupled to I/O subsystem 602 for storing information and instructions. Storage 610 is an example of a non-transitory computer-readable medium that may be used to store instructions and data, which, when executed by processor 604 causes performing computer-implemented methods to execute the techniques herein.

The instructions in memory 606, ROM 608, or storage 610 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat file system, or other data storage.

Computer system 600 may be coupled via I/O subsystem 602 to at least one output device 612. In one embodiment, output device 612 is a digital computer display. Examples of a display that may be used in various embodiments include a touchscreen display or a light-emitting diode (LED) display or a liquid crystal display (LCD) or an e-paper display. Computer system 600 may include another type(s) of output device 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on an output device 612 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host computer 624 or server computer 630.

Computer system 600 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infrared data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal, and appropriate circuitry can provide the data to I/O subsystem 602, such as placing the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to a bus or I/O subsystem 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network represented as Internet 628. A server computer 630 may be coupled to Internet 628. Server computer 630 broadly represents any computer, data center, virtual machine, or virtual computing instance with or without a hypervisor or computer executing a containerized program system such as DOCKER or KUBERNETES. Server computer 630 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 600 and server computer 630 may form elements of a distributed computing system that includes other computers, a processing cluster, a server farm, or other organization of computers that cooperate to perform tasks or execute applications or services. Server computer 630 may comprise one or more sets of instructions that are organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 630 may comprise a web application server that hosts a presentation layer, application layer, and data storage layer, such as a relational database system using a structured query language (SQL) or no SQL, an object store, a graph database, a flat file system, or other data storage.

Computer system 600 can send messages and receive data and instructions, including program code, through the network(s), network link 620, and communication interface 618. In the Internet example, a server computer 630 might transmit a requested code for an application program through Internet 628, ISP 626, local network 622, and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of managing security of an application, the computer-implemented method executed using one or more processors of a server computer and comprising:
   using a local controller service deployed within a computing environment:
      interfacing with application programming interfaces (APIs) of microservices executing in the computing environment and obtaining telemetry data in response, the telemetry data comprising security-related data;
      aggregating the telemetry data into a telemetry data payload; and
      sending a message containing the telemetry data payload to a message queue service of a central control plane;
   using the central control plane:
      creating and storing in memory a graph representing interactions of the microservices based on the telemetry data payload;
      identifying an attack path in the computing environment based on vulnerabilities identified in the security-related data using the graph; and
      displaying the graph and the attack path in real time in a graphical user interface of a computer display device.

2. The computer-implemented method of claim 1, further comprising identifying a vulnerable API of the microservices that allows an unauthenticated access and automatically preventing the unauthenticated access to the vulnerable API.

3. The computer-implemented method of claim 1, wherein the local controller service comprises a plurality of sidecar processes, each sidecar process among the plurality of sidecar processes being generated for and corresponding to each microservice among the microservices; wherein each sidecar process among the plurality of sidecar processes is configured to have access to data flowing in and out of a corresponding microservice of the microservices.

4. The computer-implemented method of claim 1, wherein the local controller service comprising an application container that a container platform API brings up in the computing environment.

5. The computer-implemented method of claim 4, wherein the local controller service is further configured to query a metadata service of the container platform API to obtain additional security-related data including:
   whether data stored in a database accessed by a microservice is encrypted;
   whether a connection to a data service is encrypted; and
   how open is an access to a specific data resource based on its network configuration.

6. The computer-implemented method of claim 1, wherein the local controller service is programmed to automatically detect a known open port of a microservice from the microservices, and output associated telemetry data based on a protocol associated with the open port.

7. The computer-implemented method of claim 1, wherein the telemetry data includes at least one of: a request source namespace, a request destination namespace, a request API endpoint, a request API method, or a request authentication header.

8. The computer-implemented method of claim 1, wherein the telemetry data includes identifying information about entities accessing any one of the microservices.

9. The computer-implemented method of claim 1, wherein the telemetry data payload is processed in an event-based asynchronous manner.

10. The computer-implemented method of claim 1, wherein the security-related data includes at least one of: a number of API requests that are unauthenticated, security-related vulnerabilities within containers and virtual machines hosting the microservices, or security-related gaps in data storage with which the microservices interact.

11. The computer-implemented method of claim 1, wherein the graph comprises:
   a plurality of graph nodes, each graph node corresponding to at least one of: a microservice from the microservices, an API of an external application, an external server, or an external client; and
   a plurality of graph edges, each graph edge connecting two graph nodes, each graph edge having associated connection attributes related to a connection between the two graph nodes.

12. The computer-implemented method of claim 11, where the connection attributes include at least one of: a number of requests to an API of a graph node per unit time, a number of unauthorized requests to an API of a graph node per a unit time, or errors associated with a connection to a graph node.

13. The computer-implemented method of claim 1, wherein identifying the attack path, the attack path includes identifying vulnerable graph nodes and graph edges.

14. A computer-implemented method of managing security of an application, the computer-implemented method comprising:
   interfacing with application programming interface (API) of microservices operated within a computing environment to obtain telemetry data, the telemetry data comprising security-related data;
   aggregating the telemetry data into a telemetry data payload;
   generating a graph representing interactions of the microservices based on the telemetry data payload;

identifying an attack path within the computing environment based on vulnerabilities identified in the security-related data using the graph; and displaying the graph and the attack path in real-time to a user.

15. The computer-implemented method of claim 14, further comprising:

identifying a vulnerable API of the microservices that allows an unauthenticated access; and preventing the unauthenticated access to the vulnerable API in an automated manner.

16. The computer-implemented method of claim 14, wherein the interfacing includes accessing data flowing in and out of a corresponding microservice from the microservices using a sidecar process, the computer-implemented method further comprising collecting the accessed data, thereby forming the telemetry data.

17. One or more non-transitory computer-readable storage media storing one or more sequences of instructions which, when executed using one or more processors, cause the one or more processors to execute a method comprising:

interfacing with application programming interface (API) of microservices operated within a computing environment to obtain telemetry data, the telemetry data comprising security-related data;

aggregating the telemetry data into a telemetry data payload;

generating a graph representing interactions of the microservices based on the telemetry data payload;

identifying an attack path within the computing environment based on vulnerabilities identified in the security-related data using the graph; and displaying the graph and the attack path in real-time to a user.

18. The one or more non-transitory computer-readable storage media of claim 17, wherein displaying the graph includes displaying:

a plurality of graph nodes, each graph node corresponding to at least one of: a microservice from the microservices, an API of an external application, an external server, or an external client; and a plurality of graph edges, each graph edge connecting two graph nodes, each graph edge having associated connection attributes related to a connection between the two graph nodes.

19. The one or more non-transitory computer-readable storage media of claim 17, wherein the attack path includes identifying vulnerable graph nodes and graph edges.

20. The one or more non-transitory computer-readable storage media of claim 17, wherein the method executed by the one or more processors further includes:

identifying a vulnerable API of the microservices that allows an unauthenticated access; and automatically preventing the unauthenticated access to the vulnerable API.

21. The one or more non-transitory computer-readable storage media of claim 17, wherein the method executed by the one or more processors further includes:

automatically detecting a known open port of a microservice from the microservices; and outputting associated telemetry data based on a protocol associated with the open port.

22. The one or more non-transitory computer-readable storage media of claim 17, wherein the telemetry data includes at least one of: a request source namespace, a request destination namespace, a request API endpoint, a request API method, or a request authentication header.

23. The one or more non-transitory computer-readable storage media of claim 17, wherein the telemetry data includes identifying information about entities accessing any one of the microservices.

24. The one or more non-transitory computer-readable storage media of claim 17, wherein the security-related data includes at least one of: a number of API requests that are unauthenticated, security-related vulnerabilities within containers and virtual machines hosting the microservices, or security-related gaps in data storage with which the microservices interact.

25. The one or more non-transitory computer-readable storage media of claim 18, where the connection attributes include at least one of: a number of requests to an API of a graph node per unit time, a number of unauthorized requests to an API of a graph node per a unit time, or errors associated with a connection to a graph node.

\* \* \* \* \*